United States Patent [19]
Jabs et al.

[11] 4,428,978
[45] Jan. 31, 1984

[54] CONCENTRATED MICROCAPSULE SUSPENSIONS FOR REACTION COPYING PAPERS

[75] Inventors: Gert Jabs, Odenthal; Günther Baatz, Buxheim; Manfred Bock; Manfred Dahm, both of Leverkusen; Artur Haus, Overath; Christian Wegner, Cologne, all of Fed. Rep. of Germany

[73] Assignee: Bayer Aktiengesellschaft, Leverkusen, Fed. Rep. of Germany

[21] Appl. No.: 265,537

[22] Filed: May 20, 1981

[30] Foreign Application Priority Data

May 28, 1980 [DE] Fed. Rep. of Germany ....... 3020148

[51] Int. Cl.$^3$ .................. B01J 13/02; B41M 3/12; C09D 11/02
[52] U.S. Cl. ............... 427/150; 71/DIG. 1; 106/21; 252/522 A; 264/4.3; 264/4.7; 424/32; 427/151; 523/176
[58] Field of Search ............... 252/316; 427/151, 150; 264/4.3, 4.7; 106/21

[56] References Cited

U.S. PATENT DOCUMENTS

| | | | |
|---|---|---|---|
| 3,016,308 | 1/1962 | Macaulay | 106/22 X |
| 3,677,787 | 7/1972 | Augl et al. | 252/316 X |
| 3,796,669 | 3/1974 | Kiritani et al. | 252/316 |
| 3,914,511 | 10/1975 | Vassiliades | 427/150 X |
| 4,140,516 | 2/1979 | Scher | 252/316 X |
| 4,193,889 | 3/1980 | Baatz et al. | 252/316 |
| 4,253,682 | 3/1981 | Baatz et al. | 252/316 X |
| 4,299,723 | 11/1981 | Dahm et al. | 252/316 |
| 4,324,817 | 4/1982 | Dahm et al. | 252/316 X |

*Primary Examiner*—Richard D. Lovering
*Attorney, Agent, or Firm*—Connolly and Hutz

[57] ABSTRACT

A process for the production of aqueous suspensions containing from 35 to 60% by weight of microcapsules by interfacial polyaddition from polyisocyanates and H-active compounds, wherein
(a) an isocyanaurate-modified aliphatic polyisocyanate is used as the polyisocyanate, and
(b) the suspension is adjusted to a pH-value of ≦7 after the polyaddition reaction, which microcapsules optimally contain dye precursors and can be used for the production of completely or partly coated copying systems by the rotogravure or flexograph processes.

3 Claims, No Drawings

CONCENTRATED MICROCAPSULE SUSPENSIONS FOR REACTION COPYING PAPERS

This invention relates to a process for the production of concentrated microcapsule suspensions by interfacial polyaddition for polyisocyanates and H-active compounds which is characterised in that isocyanurate-modified aliphatic polyisocyanates are used as the polyisocyanate and in that the aqueous suspension is adjusted to a pH-value of ≦7 immediately after the polyaddition reaction.

More particularly, the present invention relates to concentrated microcapsule suspensions containing dye precursors in encapsulated form and to their use for the production of partly coated systems by the rotogravure and flexograph processes.

The production of microcapsules by interfacial polyaddition using polyisocyanates is known, for example from German Offenlegungsschrifts Nos. 21 90 921; 22 42 920; 23 42 066 and 23 11 712.

Particular commercial interest is attributed to the encapsulation of leuco dyes for the production of reaction copying papers, as described in German Offenlegungsschrifts Nos. 25 37 982; 24 34 406 and 21 09 335 and in U.S. Pat. No. 3,900,669, for example.

Reaction copying papers are also known (cf. M. Gutcho, Capsule Technology and Microencapsulation, Noyas data Corporation, 1972, pages 242–277; G. Baxter in Microencapsulation, Processes and Applications, published by J. E. Vandegaer, Plenum Press, New York, London, pages 127–143).

Reaction copying papers preferably consist of two or more sheets of paper placed loosely on top of one another, the upper sheet being coated underneath with a donor layer and the lower sheet being coated on top with a receiving layer. In other words, a donor layer and a receiving layer are in contact with one another. The donor layer contains microcapsules, of which the core material is a solution of a dye-forming compound in an organic solvent, whilst the receiving layer contains a material which develops the dye-forming compound to form the dye.

When copying papers of this type are written on, the capsules are destroyed under the high pressure of the writing instrument and the core material which flows out impinges on the receiving layer so that a copy is formed.

The receiving layer generally contains binders and pigments, for example absorbents, such as kaolin, attapulgite, montmorillonite, bentonite, acid fuller's earth or phenolic resins. For example, acid-activatable dyes may be used in the donor layer whilst acid-reacting components may be used in the receiving layer.

The donor layer is generally applied to the paper substrate over its entire surface by conventional methods, for example as described in German Offenlegungsschrift No. 19 34 457 or 19 55 542, in other words aqueous coating compositions are required. The water has to be removed after coating and thus, the amount of energy consumed is greater, the lower the concentration of microcapsules in the coating composition.

Donor layers covering the entire surface of the paper substrate are generally unnecessary because in many cases only parts of the copying system are written on.

Accordingly, attempts have been made to apply donor layers to a part of a paper substrate. Thus, aqueous coatings have been applied to part of a paper substrate by the rotogravure or flexograph process (German Offenlegungsschrift No. 25 41 001; U.S. Pat. Nos. 3,016,308 and 3,914,511). Aqueous flexograph pastes are very highly concentrated and therefore microcapsule dispersions for this process have first to be concentrated.

The amount of energy consumed in the production of the microcapsule dispersions themselves, based on the quantity of microcapsules, is again greater, the lower the content of capsules, because the entire dispersion always has to be intensively heated or cooled.

Hitherto, it has not been possible by interfacial polymerisation directly to produce microcapsule suspensions which have a capsule content of more than 35% by weight and, at the same time, a low viscosity. The reason for this is said to be that the polyfunctional wall-forming monomers or oligomers in the individual droplets of the dispersed organic phase and the similarly polyfunctional reactants in the continuous phase enter into agglomerate-forming polymerisation reactions between the individual droplets where the content of organic phase is high.

In general, dispersions produced by interfacial polymerisation have to be thermally aftertreated for prolonged periods because, in view of the first capsule wall formation, the reactants are separated from one another and can only be made to react further at elevated temperature.

This thermal aftertreatment also increases agglomerate formation. On the other hand, only a fully reacted capsule wall would appear to have all the properties required for practical application.

The present invention is based on the discovery that concentrated suspensions containing from 35 to 60% by weight of microcapsules can be obtained by the polyaddition process provided that isocyanurate-modified aliphatic polyisocyanates are used as the polyisocyanates and provided that the suspensions are adjusted to a pH-value of 7 or lower immediately after the polyaddition reaction.

Accordingly, the present invention provides a process for the production of aqueous suspensions containing from 35 to 60% by weight of microcapsules by interfacial polyaddition from polyisocyanates and compounds containing active hydrogen which is characterised in that an isocyanurate-modified aliphatic polyisocyanate is used as the polyisocyanate and in that the suspension is adjusted to a pH-value of 7 or below immediately after the polyaddition reaction.

More particularly, the present invention relates to the production of highly concentrated microcapsule dispersions containing dye precursors in encapsulated form and to the use of these suspensions for producing partly coated copying systems by the rotogravure and flexograph processes printing The aliphatic isocyanurate-modified isocyanates used in the process according to the invention based on 1,4-xylylene diisocyanate, trimethylene diisocyanate, tetramethylene diisocyanate, propylene-1,2-diisocyanate, butylene-1,2-diisocyanate, ethylidene diisocyanate, cyclohexyl-1,4-diisocyanate, m-xylylene diisocyanate, hexamethylene-1,6-diisocyanate, 4,4'-diisocyanato-dicyclohexyl methane and isophorone diisocyanate.

Processes for the production of isocyanurate-modified polyisocyanates containing more than 2 terminal isocyanate groups are already known. The production of isocyanurate-modified polyisocyanates based on hexamethylene diisocyanate is specifically described in German Offenlegungsschrift No. 28 39 133. The others can be similarly obtained. To produce the microcapsules by polyaddition, the isocyanate may first be dissolved in the core material of what will subsequently become the capsule and the resulting organic phase emulsified in the continuous aqueous phase containing protective colloid and, optionally, emulsifiers. An aqueous polyamine solution is added to the resulting emulsion in a stoichiometric quantity, based on the polyisocyanate in the organic phase.

The hydrophobic core materials to be encapsulated may be, for example, synthetic oils, such as alkyl naphthalenes, alkylated diphenyls, alkylated diphenyl alkanes, hexahydro-terphenyl, triaryl dimethanes, chlorinated paraffins, diethyl phthalate, dibutyl phthalate, dioctyl phthalate, dibutyl maleate, toluene, dichlorobenzene or benzyl alcohol, or natural oils, such as cottonseed oil, soya bean oil, corn oil, for example maize oil, castor oil fish oil or lard.

In addition, the core material may be a synthetic and/or natural perfume oil or a solution thereof, an adhesive or an adhesive solution (for example acrylates, methacrylates, polyvinyl acetates) or a solution of natural rubber.

It is also possible to encapsulate plant protection agents and their solutions, for example various fungicides, insecticides and herbicides. Encapsulated plant protection agents reduce the acute toxicity of the active components during handling and also prolong the duration of their activity.

Solutions of dye precursors are preferably used as the core material in the process according to the invention.

Examples of the dye precursors are triphenyl methane compounds, diphenyl methane compounds, xanthene compounds, thiazine compounds and spiropyrane compounds. Suitable triphenyl methane compounds are 3,3-bis-(p-dimethylaminophenyl)-6 dimethylaminophthalide ("crystal violet lactone" or "C.V.L.") and 3,3-bis-(p-dimethylaminophenyl)-phthalide ("malachite green lactone"). Suitable dimethyl methane compounds are 4,4'-bis-dimethylamino-benzhydryl benzyl ether, N-halogen phenyl leucolamine, N-β-naphthyl leucolamine, N-2,4,5-trichlorophenyl leucolamine, N-2,4-dichlorophenly leucolamine. Suitable xanthene compounds are rhodamine-β-anilinolactam, rhodamine-β-(p-nitroaniline)-lactam, rhodamine-β-(p-chloroaniline)-lactam, 7-dimethylamine-2-methoxy fluorane, 7-diethylamine-3-methoxy fluorane, 7-diethylamine-3-methyl fluorane, 7-diethylamine-3-chloroflorane, 7-diethylamine-3-chloro-2-methyl fluorane, 7-diethylamine-2,4-dimethyl fluorane, 7-diethylamine-2,3-dimethyl fluorane, 7-diethylamine-(3-acetylmethylamine)-fluorane, 7-diethylamine-3-methyl fluorane, 3,7-diethylamine fluorane, 7-diethylamino-3-(dibenzylamine)-fluorane, 7-diethylamine-3-(methylbenzylamine)-fluorane, 7-diethylamine-3-(chloroethylmethylamino)-fluorane, 7-diethylamine-3 (dichloroethylamine)-florane and 7-diethylamine-3-(diethylamine)-fluorane. Suitable thiazine compounds are N-benzoyl leucomethylene blue o-chlorobenzoyl leucomethylene blue, p-nitrobenzoyl leucomethylene blue. Lastly, a suitable spiro compound is 3-methyl-2,2-spiro-bis-(benzo(f)-chromene).

Solvents which dissolve these dye-forming compounds are, for example, chlorinated diphenyl, chlorinated paraffin, cottonseed oil, peanut oil, silicone oil, phthalate esters, phosphate esters, sulphonate esters, monochlorobenzene, also partially hydrogenated terphenyls, alkylated diphenyls, alkylated naphthalenes, aryl ethers, aryl alkyl esters, higher-alkylated benzene and others which may be used either individually or in combination.

Diluents such as, for example, kerosene, n-paraffins and isoparaffins are frequently added to the solvents.

To produce the microcapsules by polyaddition, the isocyanate may be dissolved in the hydrophobic core materials mentioned above and the resulting organic phase emulsified in the continuous aqueous phase which contains protective colloid and, optionally, emulsifiers. An aqueous polyamine solution may be added to the resulting emulsion in a stoichiometric quantity to the polyisocyanate in the organic phase.

Diamines suitable for reaction with the isocyanates mentioned above are aliphatic, primary or secondary polyamines, such as for example 1,2-ethylene diamine, bis-(3-aminopropyl)-amine, hydrazine, hydrazine-2-ethanol, bis-(2-methylaminoethyl)-methylamine, 1,4-diaminocyclohexane, 3-amino-1-methyl-aminopropane, N-hydroxyethyl ethylene diamine, N-methyl-bis-(3-aminopropyl)-amine, 1,4-diamino-n-butane, 1,6-diamino-n-hexane, 1,2-ethylene diamine-N-ethyl sulphonic acid (in the form of an alkali salt), 1-aminoethyl-1,2-ethylene diamine and bis-(N,N'-aminoethyl)-1,2-ethylene diamine. Hydrazine and its salts are also regarded as diamines in the present context.

To emulsify and stabilise the emulsion formed, protective colloids and emulsification aids are added to the aqueous phase. Example of such products acting as protective colloids are carboxy methyl cellulose, gelatin and polyvinyl alcohol. Examples of emulsifiers are ethoxylated 3-benzyl hydroxy biphenyl, reaction products of nonyl phenol with different quantities of ethylene oxide and sorbitan fatty acid esters.

The microcapsules may be produced continuously or in batches. Dispersion machines capable of generating a shear gradient are generally used. Example of machines such as these are paddle, rotor-cage and high-speed stirrers, colloid mills, homogenisers, ultrasonic dispersers, jets, steel jets and supraton machines. The intensity of the turbulence generated during mixing is the major determining factor for the diameter of the microcapsules obtained. It is possible to produce capsules ranging from 1 to 2000 μm in diameter are preferred.

The capsules do not agglomerate and have a narrow particle size distribution. The ratio by weight of core material to shell material is from 50–90 to 50–10.

In the process according to the invention, the formulations for producing the microcapsules are adjusted in such a way that suspensions containing from 35 to 60% by weight of capsules are obtained.

After the amines have been added, the suspension is adjusted with an acid to a pH-value of 7 or lower. For example, it is possible to use aqueous mineral acids, for example hydrochloric acid, and also organic acids, such as acetic acid, oxalic acid and others. It is also possible, for example, to use acid anhydrides or acid-reacting, gaseous compounds, for example, carbon dioxide in particular.

After another brief aftertreatment, the highly concentrated suspension may be directly used for the particular purpose envisaged.

The suspensions may be converted into agglomerate-free capsule powders, for example by spray drying. Spray drying is particularly rational with suspensions as concentrated as these because the amount of water which has to be evaporated is comparatively small.

Microcapsule dispersions containing dye precursors may be used for example for the production of carbonless copying papers.

To this end, the suspensions according to the invention are provided with binders and spacers and coated onto a web-form paper substrate. The production of spreading dyes of this type has long been known.

However, highly concentrated spreading compositions may advantageously be used in the process according to the invention and the drying of the coating compositions made more rational.

In particular, the process according to the invention makes it possible to use other coating techniques, for example, coating with blade coaters or by means of gravure rolls. Although coating techniques such as these are well known, they have never been rationally used for capsule-containing coating compositions. These coating techniques enable the coating compositions to be applied considerably more quickly than for example, air-knife coating, as has hitherto normally been used in the production of carbonless copying paper.

Coating with gravure rolls is already a modified, wet "rotogravure" process.

By virtue of their high capsule content, the suspensions according to the invention may also be directly used for the production of aqueous flexograph pastes without any need for expensive concentration. The production of capsule-containing flexograph pastes and the production of completely or partly coated copying papers by the flexograph process printing are already known. The advantage of using the suspensions according to the invention lies in the fact that there is no longer any need for the hitherto essential concentration steps.

Suitable reactants for the dye precursors in the microcapsules are dye developers known per se, for example, acid clays, montmorillonite, bentonites and smectites or synthetic phenolic resins.

In copying sets, the donor component is generally the back of the top sheet. The front of the next sheet is coated with the reaction component. This layer is known as the receiving component. In copying sets, the receiving component is the top of the second sheet of paper. In the case of multiple copying sets, the following donor sheets have to carry a receiving layer on the other side. The production of receiving layers such as these is known and is also described in German Offenlegungsschrifts Nos. 19 34 457 and 19 55 542.

The process according to the invention is further illustrated by the following Examples.

EXAMPLE 1

300 g of isocyanurate-modified hexamethylene diisocyanate (NCO-content=20.5%, monomeric hexamethylene diisocyanate content <0.7%) are dissolved in 1700 g of toluene. This organic phase was emulsified by means of an ultrasonic pipe in 1605 g of an aqueous phase containing 2% of 88% hydrolysed polyvinyl acetate, the droplet size of the emulsion being adjusted to around 7 μm. 50.4 g of diethylene triamine dissolved in 344.6 g of water were then added. After addition of the amine, the suspension was adjusted to a pH-value of 6.5 by the dropwise addition of 10% hydrochloric acid, followed by tempering for 1 hour at 60° C.

Determination of the dry matter content of the suspension thus obtained revealed a capsule content of 48.5% by weight.

The suspension had a Brookfield viscosity of 240 mPas, as measured at 100 r.p.m.

EXAMPLE 2

22.5 g of isocyanurate-modified isophorone diisocyanate (NCO-content 18%) are dissolved in 127.5 g of xylene. Following the addition of 133 g of water in which 2% by weight of 88% hydrolysed polyvinyl acetate were dissolved, the product was emulsified using a Kotthoff mixing siren (8900 r.p.m.).

3 g of ethylene diamine in 47 g of water were then added.

After addition of the amine, a pH-value of 7 was adjusted by the addition of 5% aqueous sulphuric acid. The suspension was then heated to 50° C. and left at 50° C. for 2 hours.

A suspension was obtained having a measured capsule content of 45% by weight the average capsule diameter was 10 μm.

EXAMPLE 3

46 g of crystal violet lactone and 15 g of N-benzoyl leucomethylene blue were dissolved in 1372 g of diisopropyl naphthalene and 328 g of isohexadecane. 300 g of the isocyanurate-modified hexamethylene diisocyanate of Example 1 were added to this core material. This organic phase was emulsified by means of an ultrasonic pipe in 1605 g of water containing 2% by weight of 88% hydrolysed polyvinyl aceate in solution, and the size of the droplets was adjusted to 7 μm.

65 g of isophorone diamine and 19 g of hydrazine hydrate in 311 g of water were then added. After addition of the amine, carbon dioxide was passed with stirring through the suspension until a pH-value of 6.9 was reached. The slurry was then heated to 60° C. and stirred for 2 hours at that temperature. Determination of the dry matter content of the slurry revealed a capsule content of 49.5%. The slurry has a Brookfield viscosity (cf. Example 1) of 370 mPas.

EXAMPLE 4

The procedure was as described in Example 3, except that after addition of the amine, a 10% aqueous hydrochloric acid solution was added to the suspension instead of carbon dioxide. The slurry was aftertreated as further described in Example 3. The resulting suspension had a measured capsule of 49% and a viscosity of 170 mPas.

EXAMPLE 5

The microcapsule dispersions were coated with a 30 μm wire doctor onto a paper substrate and a cover sheet of a carbonless copying paper was produced in this way.

A sample of the paper thus produced was placed with its coated side on a receiving paper, after which another 7 sheets of paper were placed on top. Using a typewriter adjusted to a constant striking pressure, the letter "w" was typed on as closely as possible over an area measuring 4×4 cm. The copy of the paper sample visible on the lower receiving paper is examined for its clarity of impression by measuring the loss of reflection against a clean sheet of paper using a remission gauge (Zeiss Elrephomat).

The following clarity of impression was measured:

| | Remission value: |
|---|---|
| Example 3 | 40.6% |
| Example 4 | 37.0% |

EXAMPLE 6

A flexograph paste was prepared as follows using the suspension described in Example 3:

20 parts of shellac are stirred with 5 parts by weight of ammonia and 15 parts of water and then heated, hydrolysed and made soluble in water. 60 parts of the suspension described in Example 3 are stirred into this solution.

The paste was partly applied to a paper substrate by means of a soft rubber sheet in a flexograph machine. The rate of the coating amounted to approximately 6 g/m².

Measurement of the clarity of impression in the same way as described in Example 5 produced a remission value of 25%.

We claim:

1. In the process of producing an aqueous suspension containing from 35 to 60% by weight of microcapsules by interfacial polyaddition of polyisocyanate and a hydrogen active compound, the improvement wherein (a) an isocyanurate-modified aliphatic polyisocyanate is used as the polyisocyanate and (b) the suspension is adjusted to a pH value of $\leq 7$ after the polyaddition reaction.

2. The process of claim 1 wherein the microcapsules contain dye precursors.

3. A method for producing a completely or partly coated copying system by the rotogravure or flexograph processes employing a printing ink wherein the microcapsule suspension produced by the process of claim 2 is a constituent of the printing ink.

* * * * *